United States Patent [19]

Sokawa et al.

[11] Patent Number: 5,095,354
[45] Date of Patent: Mar. 10, 1992

[54] SCANNING FORMAT CONVERTER WITH MOTION COMPENSATION

[75] Inventors: Kenta Sokawa; Atsushi Ishizu; Kiyoshi Imai, all of Osaka, Japan

[73] Assignee: Matsushita Electric Industrial Co., Ltd., Japan

[21] Appl. No.: 565,392

[22] Filed: Aug. 10, 1990

[30] Foreign Application Priority Data

Sep. 1, 1989 [JP] Japan ................. 1-227693
Dec. 14, 1989 [JP] Japan ................. 1-325050

[51] Int. Cl.⁵ ........................................ H04N 7/01
[52] U.S. Cl. ............................. 358/105; 358/140
[58] Field of Search ........................ 358/105, 140

[56] References Cited

U.S. PATENT DOCUMENTS

| | | | |
|---|---|---|---|
| 4,608,594 | 8/1986 | Nicholson | 358/105 |
| 4,612,567 | 9/1986 | Pritchard | 358/105 |
| 4,672,445 | 6/1987 | Casey et al. | 358/140 |
| 4,868,650 | 9/1989 | Weckenbrock | 358/105 |
| 5,005,078 | 4/1991 | Gillard | 358/105 |

OTHER PUBLICATIONS

"Project for Improvement of Television Picture Quality" by K. Ohida; Journal of Japanese Television Society; vol. 40, No. 5 (1986); pp. 348-375.

Primary Examiner—James J. Groody
Assistant Examiner—Kim Yen Vu
Attorney, Agent, or Firm—Lowe, Price, LeBlanc & Becker

[57] ABSTRACT

A device detects a correlation between frames represented by a video signal of an interlaced scanning format. A sudden motion of an object represented by the video signal is detected on the basis of the detected correlation. A normal motion of the object represented by the video signal is detected on the basis of the detected correlation. Scanning lines represented by the video signl are interpolated with changeable interpolation characteristics. The interpolation characteristics are changed in response to the detected normal motion of the object. The interpolation characteristics are changed in response to the detected sudden motion of the object.

15 Claims, 11 Drawing Sheets

FIG. 14 ced image.

SCANNING FORMAT CONVERTER WITH MOTION COMPENSATION

BACKGROUND OF THE INVENTION

1. Field of the Invention

This invention relates to a video signal processing apparatus including an interpolator controlled by a motion detector.

2. Description of the Prior Art

When a display device reproduces an image from a video signal by interlaced scanning, the reproduced image tends to be contaminated by line flickers. The interlaced scanning is a main cause of the line flickers. To remove such line flickers, it is known to interpolate scanning lines and thereby to enable progressive scanning.

A prior-art video signal processing apparatus includes an inter-line interpolator, an inter-field interpolator, and a motion detector which detects a motion of an object on the basis of a signal representative of a luminance difference between frames of a video signal. In the presence of a detection output from the motion detector, an interpolation signal generated by the inter-line interpolator is selected. In the absence of a detection output from the motion detector, an interpolation signal generated by the inter-field interpolator is selected or a weighted addition of the interpolation signals generated by the two interpolators is used.

In the above-mentioned prior-art video signal processing apparatus, a certain condition such as a slight vibration of an object in a vertical direction or a sudden disappearance of a horizontally-extending edge of a superimposed letter tend to be detected as a motion which causes a change of the interpolation from the inter-field type to the inter-line type. It is generally better to maintain the inter-field interpolation under such a certain condition from the standpoint of the quality of a reproduced image.

SUMMARY OF THE INVENTION

It is an object of this invention to provide an improved video signal processing apparatus.

According to a first aspect of this invention, a video signal processing apparatus comprises means for detecting a correlation between frames represented by a video signal of an interlaced scanning format; means for detecting a sudden motion of an object represented by the video signal on the basis of said detected correlation; means for detecting a normal motion of the object represented by the video signal on the basis of said detected correlation; means for interpolating scanning lines represented by the video signal with changeable interpolation characteristics; means for changing the interpolation characteristics in response to said detected normal motion of the object; and means for changing the interpolation characteristics in response to said detected sudden motion of the object.

According to a second aspect of this invention, a video signal processing apparatus comprises difference detecting means for detecting a difference between frames represented by a video signal of an interlaced scanning format, and for generating a frame difference signal representative of said detected difference between the frames; means for generating a motion coefficient on the basis of said frame difference signal; means for interpolating scanning lines represented by said video signal with changeable interpolation characteristics; means for changing said interpolation characteristics in accordance with said motion coefficient; means for comparing said frame difference signal with a signal representative of a predetermined threshold; means for taking out results of said comparing at adjacent pixels; pattern detecting means for detecting that said taken-out results have a predetermined pattern; and means for changing said motion coefficient to change the interpolation characteristics toward interpolation characteristics suited to a stationary picture when said pattern detecting means detects that the taken-out results have the predetermined pattern.

According to a third aspect of this invention, a video signal processing apparatus comprises difference detecting means for detecting a difference between frames represented by a video signal of an interlaced scanning format, and for generating a frame difference signal representative of said detected difference between the frames; means for generating a motion coefficient on the basis of said frame difference signal; means for interpolating scanning lines represented by said video signal with changeable interpolation characteristics; means for changing said interpolation characteristics in accordance with said motion coefficient; means for comparing said frame difference signal with a signal representative of a predetermined threshold; means for taking out results of said comparing at adjacent pixels; pattern detecting means for detecting that said taken-out results have a predetermined pattern, and for outputting a signal representative of a result of the detection that said taken-out results have the predetermined pattern; outline detecting means for detecting a horizontal outline of an object represented by the video signal, and for outputting a signal representative of said detected horizontal outline; means for gating the output signal from said pattern detecting means in response to the output signal from said outline detecting means; and means for changing said motion coefficient in response to an output signal of said gating means to change the interpolation characteristics toward interpolation characteristics suited to a stationary picture.

According to a fourth aspect of this invention, a video signal processing apparatus comprises difference detecting means for detecting a difference between frames represented by a video signal of an interlaced scanning format, and for generating a frame difference signal representative of said detected difference between the frames; means for generating a motion coefficient on the basis of said frame difference signal; means for interpolating scanning lines represented by said video signal with changeable interpolation characteristics; means for changing said interpolation characteristics in accordance with said motion coefficient; outline detecting means for detecting a horizontal outline of an object represented by the video signal, and for outputting a signal representative of said detected horizontal outline; means for setting a threshold signal representative of a threshold in accordance with the output signal from said outline detecting means; means for comparing said frame difference signal with said threshold signal; means for taking out results of said comparing at adjacent pixels; pattern detecting means for detecting that said taken-out results have a predetermined pattern, and for outputting a signal representative of a result of the detection that said taken-out results have the predetermined pattern; and means for changing said motion coefficient in response to the output signal from said pattern detecting means to change the interpolation characteristics toward interpolation characteristics suited to a stationary picture when said pattern detecting means detects that the taken-out results have the predetermined pattern.

According to a fifth aspect of this invention, a video signal processing apparatus comprises means for interpolating parts of a video signal with changeable interpolation characteristics; means for detecting a predetermined sudden vertical motion of an object represented by the video signal; and means for changing said interpolation characteristics when said detecting means detects the sudden vertical motion.

DESCRIPTION OF THE FIRST PREFERRED EMBODIMENT

Figure 1:
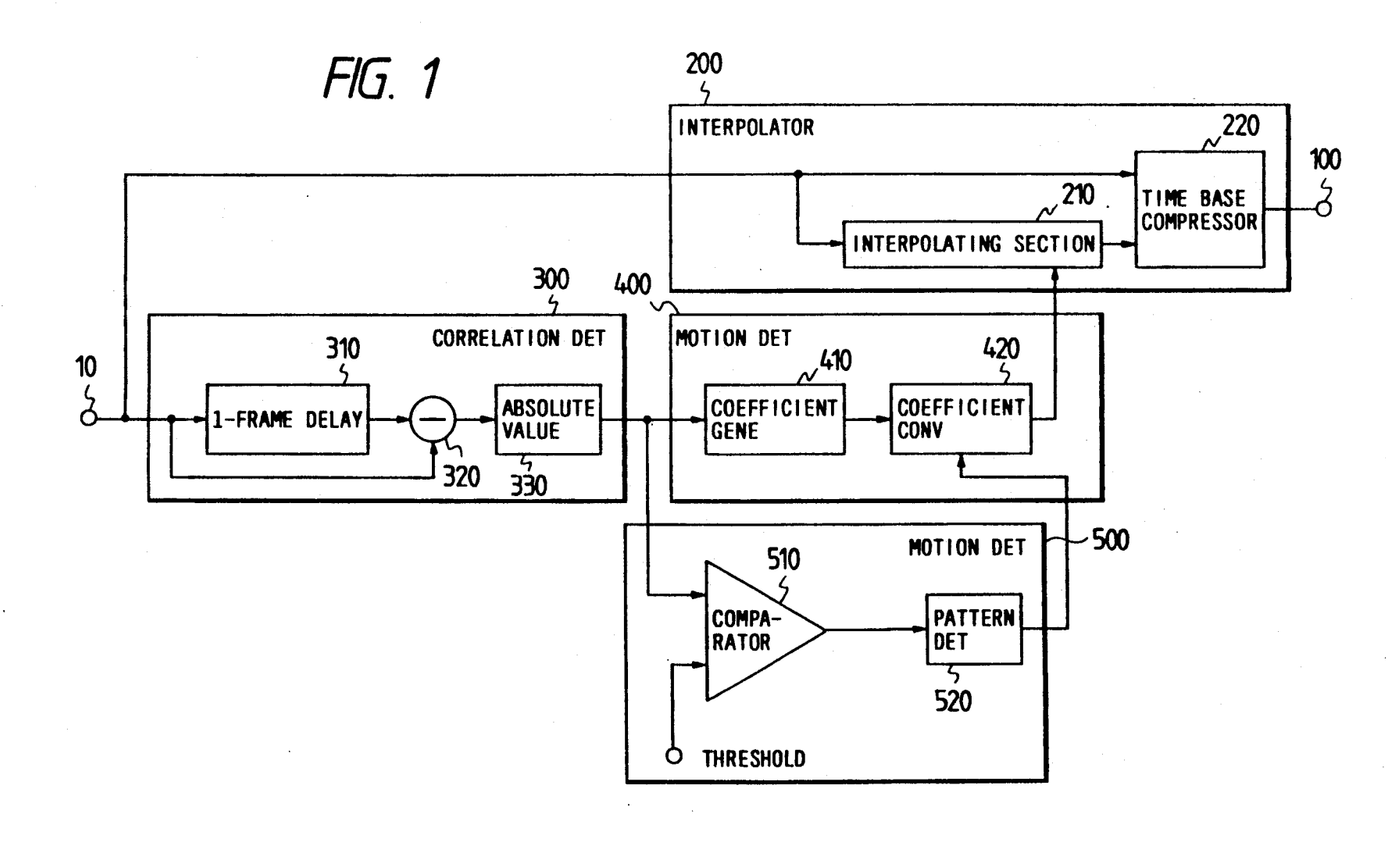
FIG. 1 is a block diagram of a video signal processing apparatus according to a first embodiment of this invention.

With reference to FIG. 1, a video signal processing apparatus includes a scanning line interpolator 200 and an inter-frame correlation detector 300. A video signal of an interlaced scanning format is applied to the scanning line interpolator 200 and the inter-frame correlation detector 300 via an input terminal 10.

The inter-frame correlation detector 300 includes a 1-frame period delay device 310, a subtracter 320, and an absolute value circuit 330. The video signal is applied to the 1-frame period delay device 310 and a first input terminal of the subtracter 320. The video signal is delayed by the 1-frame period delay device 310 by a 1-frame period. The output signal from the 1-frame period delay device 310, that is, the delayed video signal, is applied to a second input terminal of the subtracter 320.

The subtracter 320 derives a difference between the non-delayed video signal and the delayed video signal, and outputs a signal representing a difference between two successive frames of the video signal. The frame difference signal is fed from the subtracter 320 to the absolute value circuit 330. The frame difference signal is converted by the absolute value circuit 330 into an absolute frame difference signal representing the absolute value of the frame difference signal. The absolute frame difference signal is outputted from the absolute value circuit 330 to a normal motion detector 400 and a sudden motion detector 500.

The normal motion detector 400 includes a coefficient generator 410 and a coefficient converter 420. The absolute frame difference signal is fed to the coefficient generator 410. The coefficient generator 410 generates a signal representative of a primary motion coefficient k1 in dependence upon the absolute frame difference signal. For example, the primary motion coefficient k1 is set to "1" when the absolute value of the difference between the two successive frames exceeds a predetermined threshold, that is, when an appreciable motion of an object is present, and the primary motion coefficient k1 is set to "0" in other cases. Thus, the primary motion coefficient k1 equals "1" when an image is appreciably moving, and the primary motion coefficient k1 equals "0" when an image is substantially stationary. It should be noted that the primary motion coefficient k1 may be varied continuously between "0" and "1" as the absolute value of the difference between the two successive frames increases from its minimum to its maximum. The primary motion coefficient signal is outputted from the coefficient generator 410 to the coefficient converter 420. The coefficient converter 420 changes the primary motion coefficient signal into a signal representative of a final motion coefficient k2 in response to a detection signal outputted from the sudden motion detector 500. Specifically, the coefficient converter 420 converts the primary motion coefficient k1 into the final motion coefficient k2 in response to the detection signal from the sudden motion detector 500. The final motion coefficient signal is outputted from the coefficient converter 420 to the scanning line interpolator 200.

The sudden motion detector 500 includes a comparator 510 and a pattern detector 520. A first input terminal of the comparator 510 is subjected to the absolute frame difference signal outputted from the inter-frame correlation detector 300. A second input terminal of the comparator 510 is subjected to a signal representative of a given threshold which is generated by a suitable device (not shown). The comparator 510 compares the absolute frame difference signal with the threshold signal, that is, compares the absolute value of the difference between the two successive frames with the threshold. When the absolute value of the difference is greater than the threshold, the comparator 510 outputs a logical "H" signal. Otherwise, the comparator 510 outputs a logical "L" signal. The output signal from the comparator 510 is fed to and is processed by the pattern detector 520.

Figure 2:
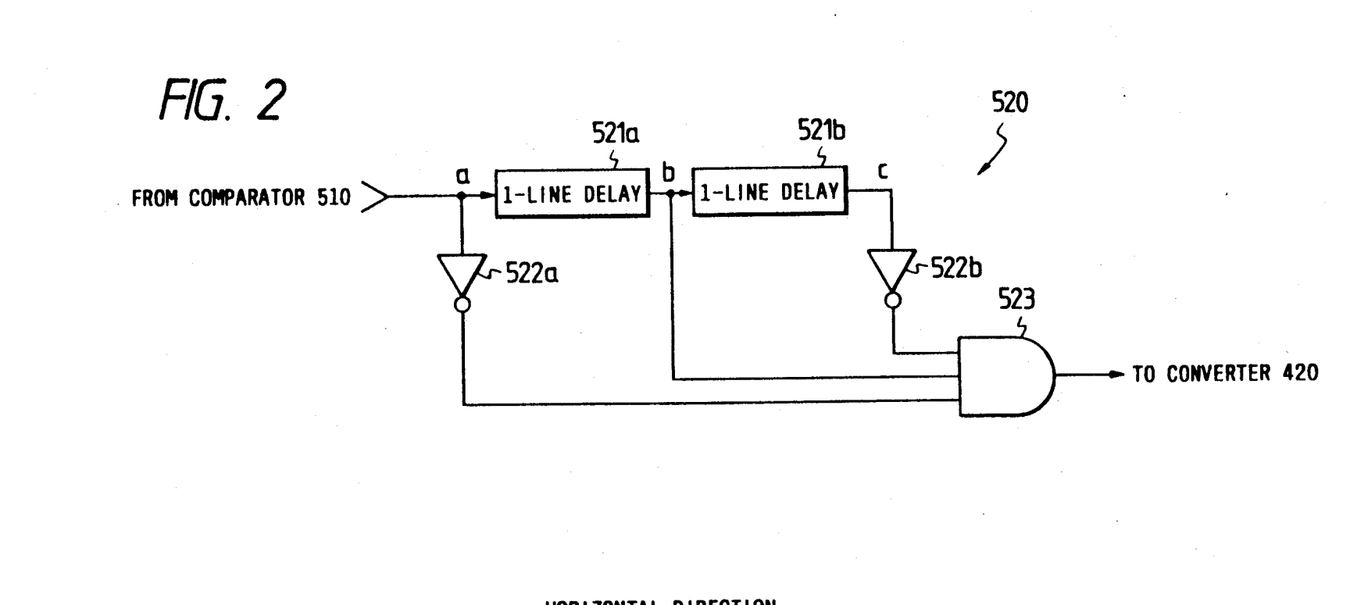
FIG. 2 is a block diagram of the pattern detector of FIG. 1.
Figure 3:
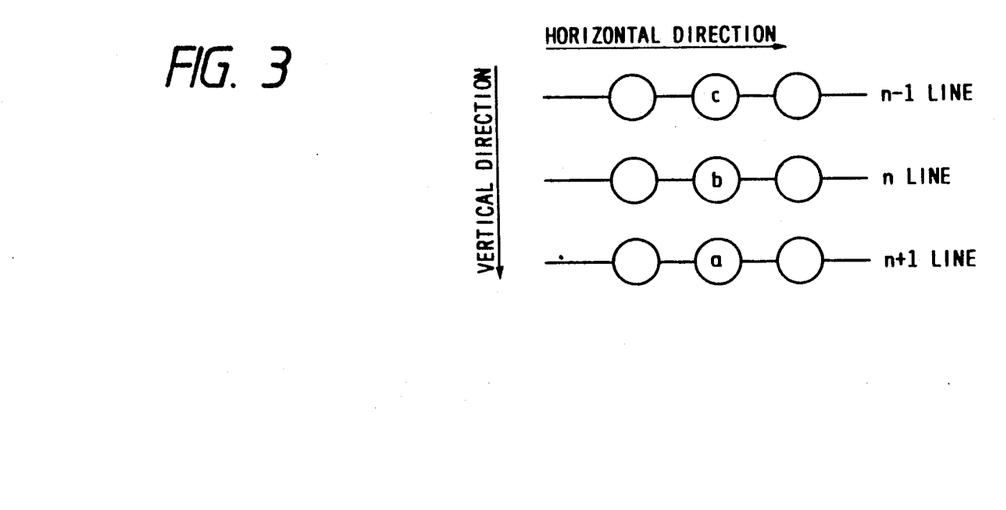
FIG. 3 is a diagram showing pixels used in the pattern detection by the pattern detector of FIG. 2.

As shown in FIG. 2, the pattern detector 520 includes 1-line period delay devices 521a and 521b, inverters 522a and 522b, and an AND gate 523. The output signal from the comparator 510 is fed to the 1-line period delay device 521a and the inverter 522a. The output signal from the comparator 510 is inverted by the inverter 522a. The output signal from the inverter 522a is applied to a first input terminal of the AND gate 523. The output signal from the comparator 510 is delayed by the 1-line period delay device 521a by a 1-line period. The output signal from the 1-line period delay device 521a is applied to a second input terminal of the AND gate 523. In addition, the output signal from the 1-line period delay device 521a is fed to the 1-line period delay device 521b. The output signal from the 1-line period delay device 521a is delayed by the 1-line period delay device 521b by a 1-line period. Thus, the output signal from the comparator 510 is delayed by the combination of the 1-line period delay devices 521a and 521b by a 2-line period. The output signal from the 1-line period delay device 521b is fed to the inverter 522b. The output signal from the 1-line period delay device 521b is inverted by the inverter 522b. The output signal from the inverter 522b is applied to a third input terminal of the AND gate 523. The AND gate 523 executes a logical AND operation among the output signals from the devices 522a, 521a, and 522b. The output signal from the AND gate 523 is used as a detection output signal from the sudden motion detector 500 which is fed to the coefficient converter 420 within the normal motion detector 400. In FIG. 2: the point "a" leads to the input terminals of the 1-line period delay device 521a and the inverter 522a; the point "b" is a junction between the output terminal of the 1-line period delay device 521a and the input terminal of the 1-line period delay device 521b; and the point "c" is a junction between the output terminal of the 1-line period delay device 521b and the input terminal of the inverter 522b. The logical signal values at these points "a", "b", and "c" correspond to logical signal values at pixels "a", "b", and "c" in FIG. 3 respectively. As understood from FIG. 3, logical signal values at pixels ("a", "b", and "c") which lie in three successive lines and which align in the vertical direction are taken out by use of the 1-line period delay devices 521a and 521b, and a logical operation among these logical signal values is executed by the devices 522a, 522b, and 523. When the logical signal values at the points "a", "b", and "c" are equal to "L", "H", and "L" respectively, the output signal from the AND gate 523 is "H". Otherwise, the output signal from the AND gate 523 is "L". Under a certain condition such as a slight vibration of an object in a vertical direction or a sudden disappearance of a horizontal edge (a horizontally-extending edge) of a superimposed letter, there generally occurs such an "L"-"H"-"L" pattern of the logical signal values at pixels which lie in three successive lines and which have equal vertical positions. Thus, such a certain condition can be detected by examining whether or not an "L"-"H"-"L" pattern of the logical signal values at vertically neighboring pixels is present. The "H" output signal from the AND gate 523 constitutes a detection signal representing the presence of a certain condition such as a slight vibration of an object in a vertical direction or a sudden disappearance of a horizontal edge (a horizontally-extending edge) of a superimposed letter.

Figure 4:
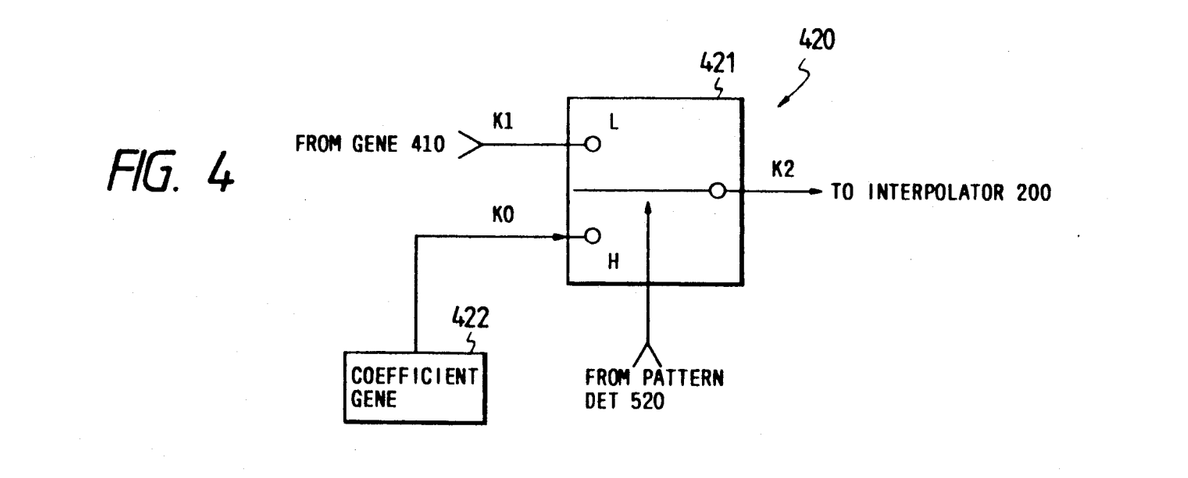
FIG. 4 is a block diagram of the coefficient converter of FIG. 1.

As shown in FIG. 4, the coefficient converter 420 includes a selector 421 and a coefficient generator 422. The coefficient generator 422 outputs a signal representing a fixed motion coefficient K0 which equals "0". The selector 421 includes two input terminals subjected to the motion coefficient signals fed from the coefficient generators 410 and 422 respectively. A control terminal of the selector 421 receives the output signal from the sudden motion detector 500. The selector 421 selects one of the motion coefficient signals in response to the output signal from the sudden motion detector 500, and outputs the selected one of the motion coefficient signals to the scanning line interpolator 200 as a final motion coefficient signal representative of a motion coefficient k2. Specifically, when the output signal from the sudden motion detector 500 is "H", that is, when a sudden vertical motion is present, the motion coefficient signal from the coefficient generator 422 is selected by the selector 421 and is transmitted to the scanning line interpolator 200. Thus, in this case, the final motion coefficient k2 equals the motion coefficient k0 (=0) determined by the coefficient generator 422. When the output signal from the sudden motion detector 500 is "L", that is, when a sudden vertical motion is absent, the motion coefficient signal from the coefficient generator 410 is selected by the selector 421 and is transmitted to the scanning line interpolator 200. Thus, in this case, the final motion coefficient k2 equals the motion coefficient k1 determined by the coefficient generator 410. The motion coefficient signal fed to the selector 421 from the coefficient generator 410 and the detection output signal fed to the selector 421 from the sudden motion detector 500 are synchronized so that the two signals will correspond to the same pixel when they enter the selector 421.

The scanning line interpolator 200 includes a scanning line interpolating section 210 and a time base compressor 220. The input video signal is applied to the scanning line interpolating section 210. In addition, the input video signal is applied to a first input terminal of the time base compressor 220.

Figure 5:
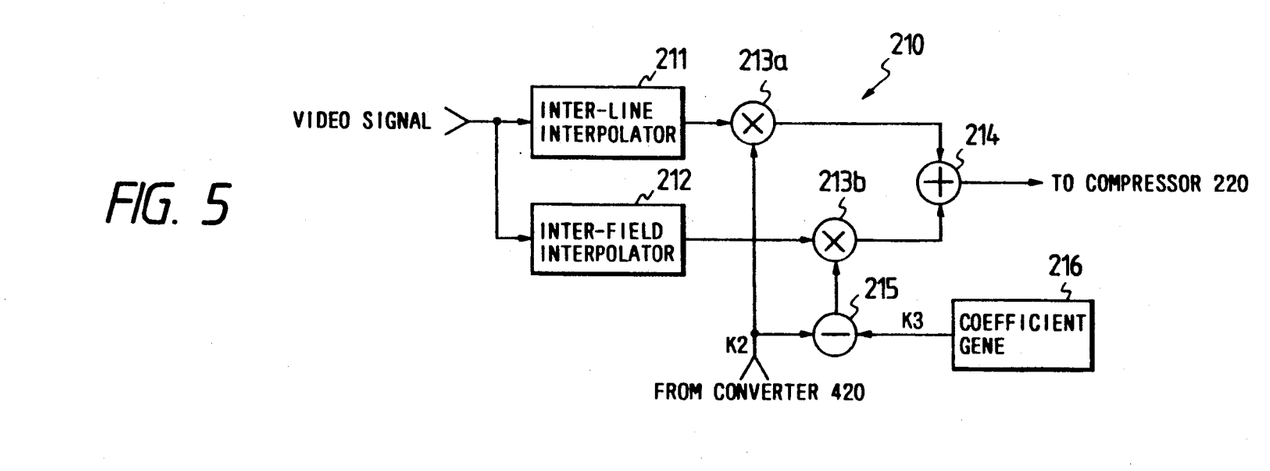
FIG. 5 is a block diagram of the scanning line interpolating section of FIG. 1.

As shown in FIG. 5, the scanning line interpolating section 210 includes an inter-line interpolator 211, an inter-field interpolator 212, multipliers 213a and 213b, and adder 214, a subtracter 215, and a coefficient generator 216. The input video signal is fed to the inter-line interpolator 211 and the inter-field interpolator 212. The inter-line interpolator 211 generates an inter-line interpolation signal on the basis of the input video signal. The inter-line interpolation signal is fed from the inter-line interpolator 211 to a first input terminal of the multiplier 213a. A second input terminal of the multiplier 213a is subjected to the final motion coefficient signal outputted from the coefficient converter 420. The multiplier 213a multiplies the inter-line interpolation signal by the final motion coefficient k2. The output signal from the multiplier 213a is fed to a first input terminal of the adder 214. On the other hand, the inter-field interpolator 212 generates an inter-field interpolation signal on the basis of the input video signal. The inter-field interpolation signal is fed from the inter-field interpolator 212 to a first input terminal of the multiplier 213b. The coefficient generator 216 outputs a signal representing a fixed motion coefficient k3 which equals "1". A first input terminal of the subtracter 215 is subjected to the motion coefficient signal outputted from the coefficient generator 216. A second input terminal of the subtracter 215 is subjected to the final motion coefficient signal outputted from the coefficient converter 420. The subtracter 215 executes the subtraction between the coefficient signals outputted from the devices 216 and 420, and generates a signal representing a motion coefficient which equals "1−k2". The motion coefficient signal generated by the subtracter 215 is applied to a second input terminal of the multiplier 213b. The multiplier 213b multiplies the inter-field interpolation signal by the motion coefficient "1−k2". The output signal from the multiplier 213b is fed to a second input terminal of the adder 214. The adder 214 adds the output signals from the multipliers 213a and 213b, and thereby generates a final interpolation signal. In this way, a weighted addition between the inter-line interpolation signal and the inter-field interpolation signal is performed in dependence upon the final motion coefficient k2, and a final interpolation signal is generated on the basis of the result of the weighted addition. When the final motion coefficient k2 equals "1", the inter-line interpolation signal is selected by the combination of the devices 213a, 213b, 214, and 215 so that the final interpolation signal exactly agrees with the inter-line interpolation signal. On the other hand, when the final motion coefficient k2 equals "0", the inter-field interpolation signal is selected by the combination of the devices 213a, 213b, 214, and 215 so that the final interpolation signal exactly agrees with the inter-field interpolation signal. The final interpolation signal is fed from the adder 214 to a second input terminal of the time base compressor 220.

The time base compressor 220 compresses the time bases of the video signal and the final interpolation signal, and alternately outputs the compressed video signal and the compressed final interpolation signal to generate a progressive-scanning-format video signal. The progressive-scanning-format video signal outputted from the time base compressor 220 is transmitted via an output terminal 100.

When a slight vibration of an object in a vertical direction or a sudden disappearance of a horizontal edge of a superimposed letter occurs, such a sudden motion is detected by the sudden motion detector 500 and the final motion coefficient k2 is forcedly set to "0" by the coefficient converter 420 in response to the output signal from the sudden motion detector 500. Accordingly, in this case, the inter-field interpolation signal is selected by the scanning line interpolating section 210 so that a reproduced image can be free from line flickers.

This embodiment may be modified in various ways. For example, the inter-frame correlation detector 300 may be modified so as to detect the correlation between frames separated by a two-frame period or longer. In another modification, the fixed motion coefficient k0 determined by the coefficient generator 422 is set to a value larger than "0" but smaller than "1", preferably, a value equal to about 0.5. In this case, the final interpolation signal agrees with an intermediate between the inter-line interpolation signal and the inter-field interpolation signal during a positive detection by the sudden motion detector 500, and a wrong detection by the sudden motion detector 500 can be compensated.

DESCRIPTION OF THE SECOND PREFERRED EMBODIMENT

Figure 6:
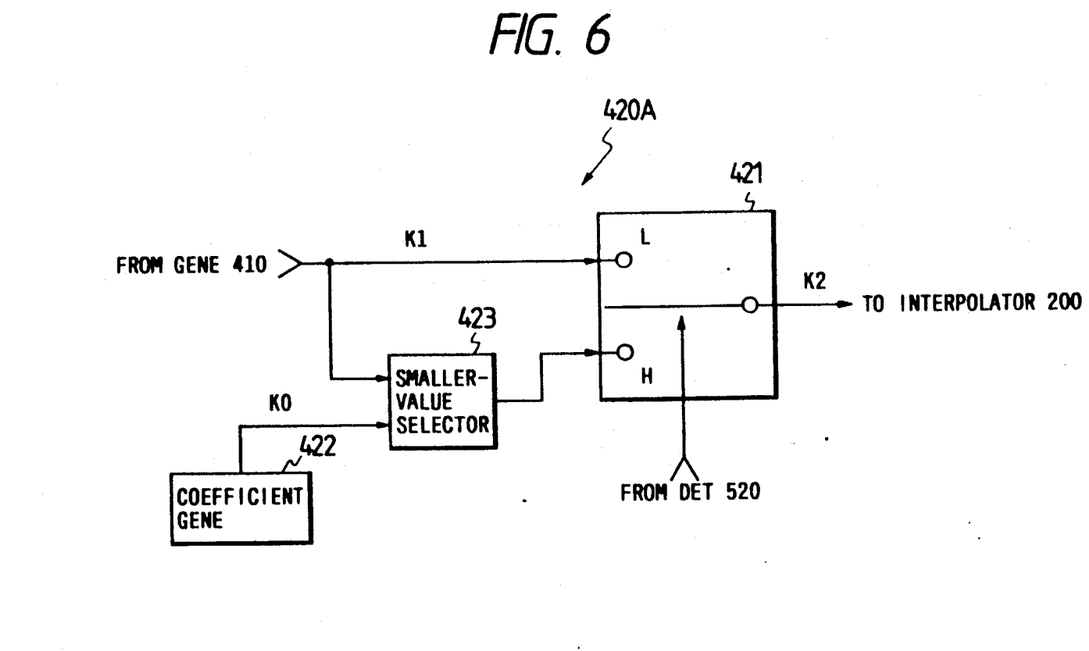
FIG. 6 is a block diagram of a coefficient converter in a video signal processing apparatus according to a second embodiment of this invention.

FIG. 6 shows a part of a second embodiment of this invention which is similar to the embodiment of FIGS. 1-5 except for a coefficient converter 420A. In the embodiment of FIG. 6, the coefficient converter 420A includes a selector 421, a coefficient generator 422, and a smaller value selector 423. The coefficient generator 422 outputs a signal representing a fixed motion coefficient k0 which equals 0.5 for example. The motion coefficient signal outputted from the coefficient generator 422 is applied to a first input terminal of the smaller value selector 423. A second input terminal of the smaller value selector 423 is subjected to a motion coefficient signal representative of a motion coefficient k1 which is generated by a coefficient generator 410 (see FIG. 1). The smaller value selector 423 selects one of the motion coefficient signals outputted from the coefficient generators 422 and 410 which represents the smaller of the motion coefficients k0 and k1. In other words, when the motion coefficient k1 is equal to or smaller than the motion coefficient k0, the motion coefficient signal outputted from the coefficient generator 410 is selected by the smaller value selector 423. When the motion coefficient k0 is smaller than the motion coefficient k1, the motion coefficient signal outputted from the coefficient generator 422 is selected by the smaller value selector 423. The selected motion coefficient signal is transmitted from the smaller value selector 423 to an input terminal of the selector 421. Another input terminal of the selector 421 is subjected to the motion coefficient signal outputted from the coefficient generator 410 (see FIG. 1). A control terminal of the selector 421 receives the output signal from a sudden motion detector 500 (see FIG. 1). The selector 421 selects one of the motion coefficient signals fed from the devices 410 and 423 in response to the output signal from the sudden motion detector 500, and outputs the selected one of the motion coefficient signals to a scanning line interpolator 200 (see FIG. 1) as a final motion coefficient signal representative of a motion coefficient k2.

Specifically, when the output signal from the sudden motion detector 500 is "H", that is, when a sudden vertical motion is present, the motion coefficient signal from the smaller value selector 423 is selected by the selector 421 and is transmitted to the scanning line interpolator 200. Thus, in this case, the final motion coefficient k2 equals the motion coefficient k0 (=0.5) when the motion coefficient k0 is smaller than the motion coefficient k1, and the final motion coefficient k2 equals the motion coefficient k1 when the motion coefficient k0 is not smaller than the motion coefficient k1. Accordingly, during a positive detection by the sudden motion detector 500, the smaller of the motion coefficients k0 (=0.5) and k1 is selected and used so that the weight of an inter-field interpolation signal is greater than the weight of an inter-line interpolation signal. This process reliably prevents a reproduced image from being contaminated by line flickers. On the other hand, when the output signal from the sudden motion detector 500 is "L", that is, when a sudden vertical motion is absent, the motion coefficient signal from the coefficient generator 410 is selected by the selector 421 and is transmitted to the scanning line interpolator 200. Thus, in this case, the final motion coefficient k2 equals the motion coefficient k1 determined by the coefficient generator 410.

DESCRIPTION OF THE THIRD PREFERRED EMBODIMENT

Figure 7:
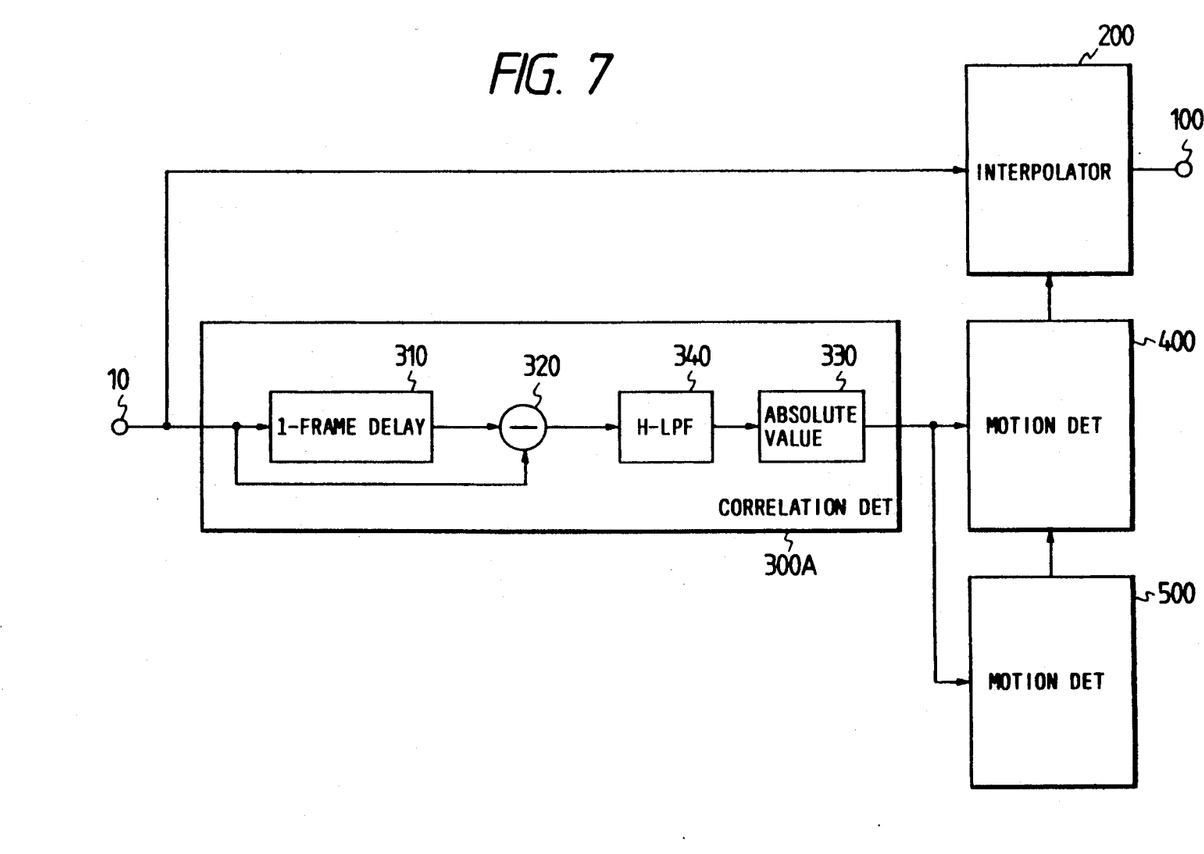
FIG. 7 is a block diagram of a video signal processing apparatus according to a third embodiment of this invention.

FIG. 7 shows a third embodiment of this invention which is similar to the embodiment of FIGS. 1-5 except that an inter-frame correlation detector 300A includes a horizontal-direction low pass filter 340 disposed between a subtracter 320 and an absolute value circuit 330. The horizontal-direction low pass filter 340 removes noise and wrong components from an output signal of the inter-frame correlation detector 300A.

DESCRIPTION OF THE FOURTH PREFERRED EMBODIMENT

Figure 8:
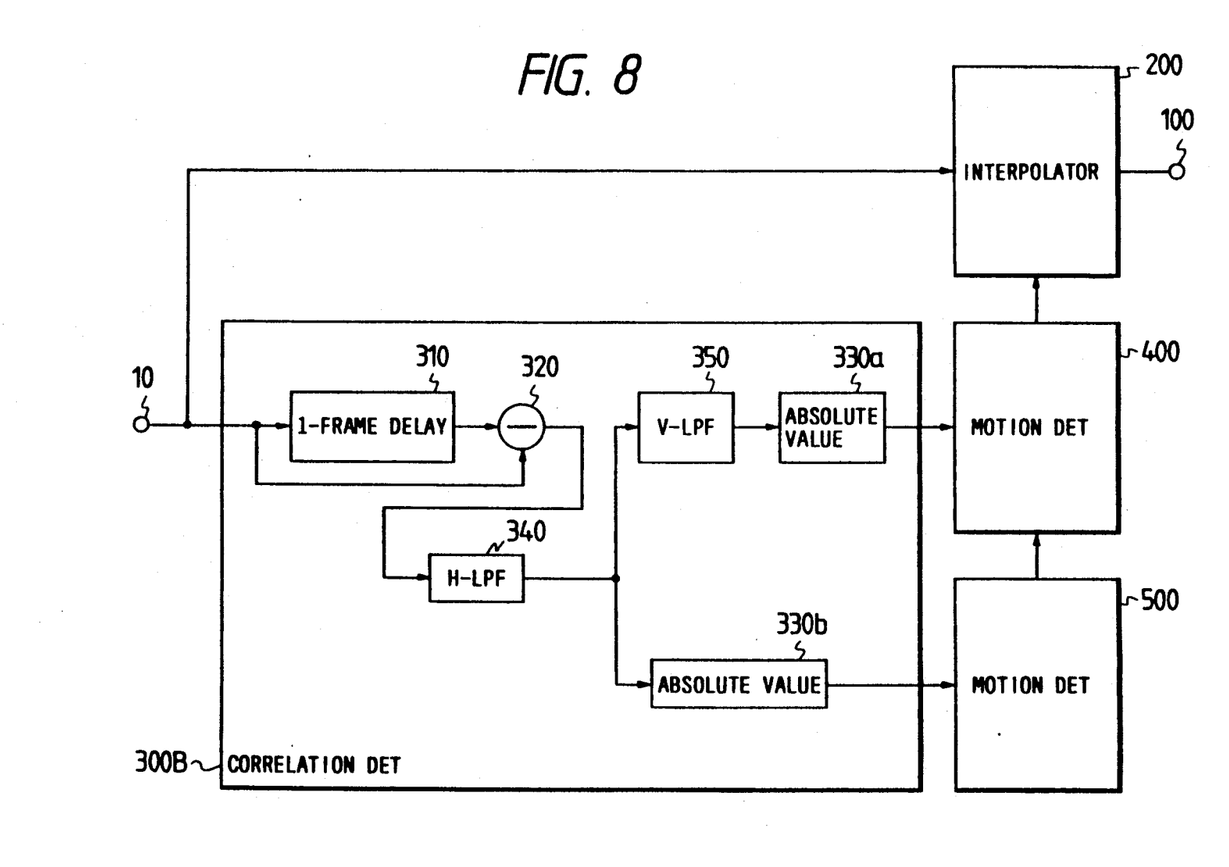
FIG. 8 is a block diagram of a video signal processing apparatus according to a fourth embodiment of this invention.

FIG. 8 shows a fourth embodiment of this invention which is similar to the embodiment of FIGS. 1-5 except for an inter-frame correlation detector 300B. In the embodiment of FIG. 8, the inter-frame correlation detector 300B includes a 1-frame period delay device 310, a subtracter 320, a horizontal-direction low pass filter 340, a vertical-direction low pass filter 350, and absolute value circuits 330a and 330b.

The video signal is applied to the 1-frame period delay device 310 and a first input terminal of the subtracter 320. The video signal is delayed by the 1-frame period delay device 310 by a 1-frame period. The output signal from the 1-frame period delay device 310, that is, the delayed video signal, is applied to a second input terminal of the subtracter 320. The subtracter 320 derives a difference between the non-delayed video signal and the delayed video signal, and outputs a signal representing a difference between two successive frames of the video signal. The frame difference signal is fed from the subtracter 320 to the horizontal-direction low pass filter 340. The horizontal-direction low pass filter 340 removes noise and wrong components from the frame difference signal. The noise-free frame difference signal outputted from the horizontal-direction low pass filter 340 is fed to the vertical-direction low pass filter 350 and the absolute value circuit 330b. The noise-free frame difference signal is converted by the absolute value circuit 330b into an absolute frame difference signal representing the absolute value of the noise-free frame difference signal. The absolute frame difference signal is outputted from the absolute value circuit 330b to a sudden motion detector 500 so that a sudden vertical motion will be detected on the basis of the absolute frame difference signal by the sudden motion detector 500.

The vertical-direction low pass filter 340 limits a vertical-frequency band of the noise-free frame difference signal. The vertical-band-limited frame difference signal outputted from the vertical-direction low pass filter 340 is fed to the absolute value circuit 330a. The vertical-band-limited frame difference signal is converted by the absolute value circuit 330a into an absolute vertical-band-limited frame difference signal representing the absolute value of the vertical-band-limited frame difference signal. The absolute vertical-band-limited frame difference signal is outputted from the absolute value circuit 330a to a normal motion detector 400 so that a normal motion will be detected on the basis of the absolute vertical-band-limited frame difference signal by the normal motion detector 400.

A sudden vertical motion is represented by signal components having high vertical frequencies. Such high vertical frequency components are removed by the vertical-direction low pass filter 350 so that a sudden vertical motion is excluded from motions detectable by the normal motion detector 400.

DESCRIPTION OF THE FIFTH PREFERRED EMBODIMENT

Figure 9:
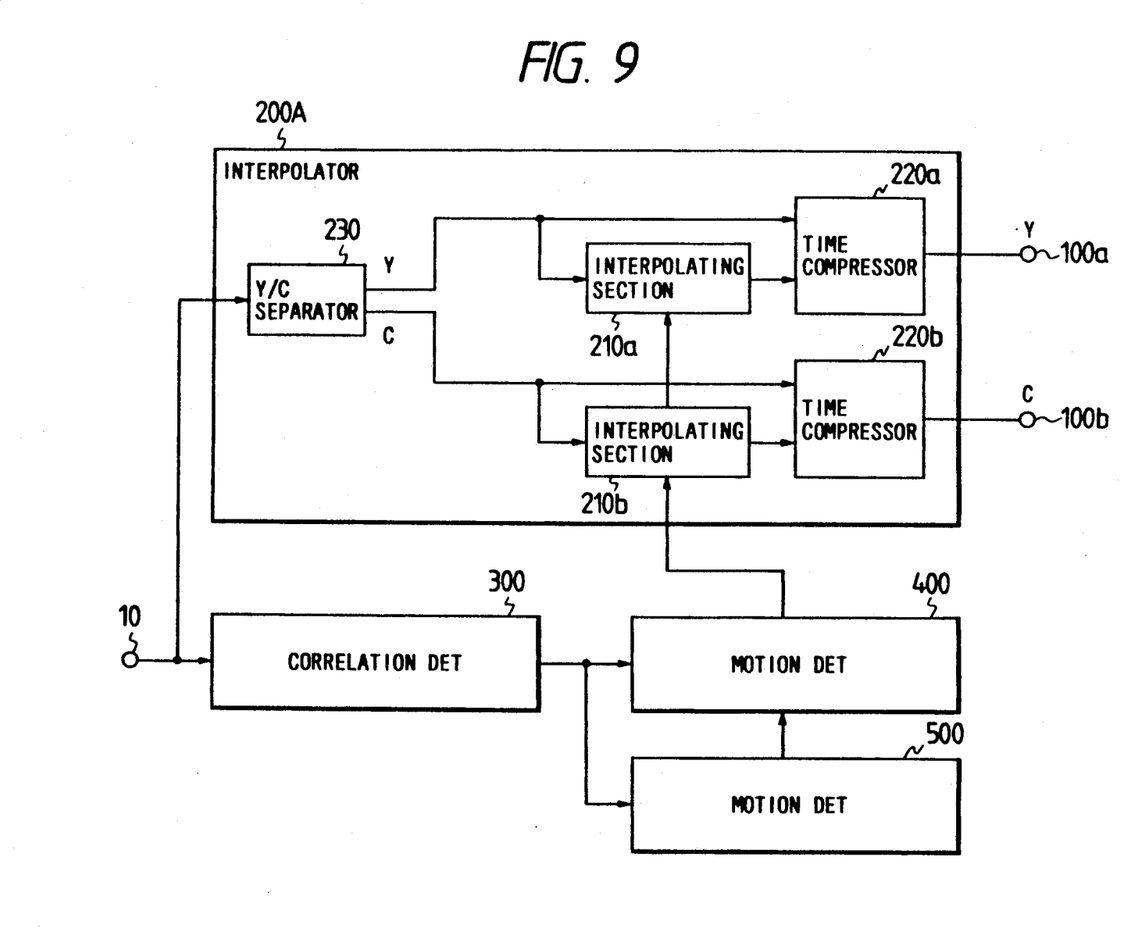
FIG. 9 is a block diagram of a video signal processing apparatus according to a fifth embodiment of this invention.

FIG. 9 shows a fifth embodiment of this invention which is similar to the embodiment of FIGS. 1-5 except for design changes indicated hereinafter. The embodiment of FIG. 9 is designed so as to process an interlaced-scanning-format video signal such as an NTSC signal or a PAL signal. In the embodiment of FIG. 9, a scanning line interpolator 200A includes a Y-signal/C-signal separator (a Y/C separator) 230, scanning line interpolating sections 210a and 210b, and time base compressors 220a and 220b.

An input video signal is separated by the Y/C separator 230 into a luminance signal (a Y signal) and a color signal (a C signal). The luminance signal is fed to the scanning line interpolating section 210a. In addition, the luminance signal is fed to a first input terminal of the time base compressor 220a. The scanning line interpolating section 210a is similar to the scanning line interpolating section 210 of FIGS. 1 and 5, and is controlled by an output signal from a normal motion detector 400. The scanning line interpolation section 210a outputs an interpolation signal to a second input terminal of the time base compressor 220a. The time base compressor 220a is similar to the time base compressor 220 of FIG. 1, and generates a progressive-scanning-format luminance signal by compressing and combining the luminance signal and the interpolation signal fed from the devices 230 and 210a. The progressive-scanning-format luminance signal outputted from the time base compressor 220a is transmitted via an output terminal 100a.

The color signal is fed to the scanning line interpolating section 210b. In addition, the color signal is fed to a first input terminal of the time base compressor 220b. The scanning line interpolating section 210b is similar to the scanning line interpolating section 210 of FIGS. 1 and 5, and is controlled by the output signal from the normal motion detector 400. The scanning line interpolation section 210b outputs an interpolation signal to a second input terminal of the time base compressor 220b. The time base compressor 220b is similar to the time base compressor 220 of FIG. 1, and generates a progressive-scanning-format color signal by compressing and combining the color signal and the interpolation signal fed from the devices 230 and 210b. The progressive-scanning-format color signal outputted from the time base compressor 220b is transmitted via an output terminal 100b.

DESCRIPTION OF THE SIXTH PREFERRED EMBODIMENT

Figure 10:
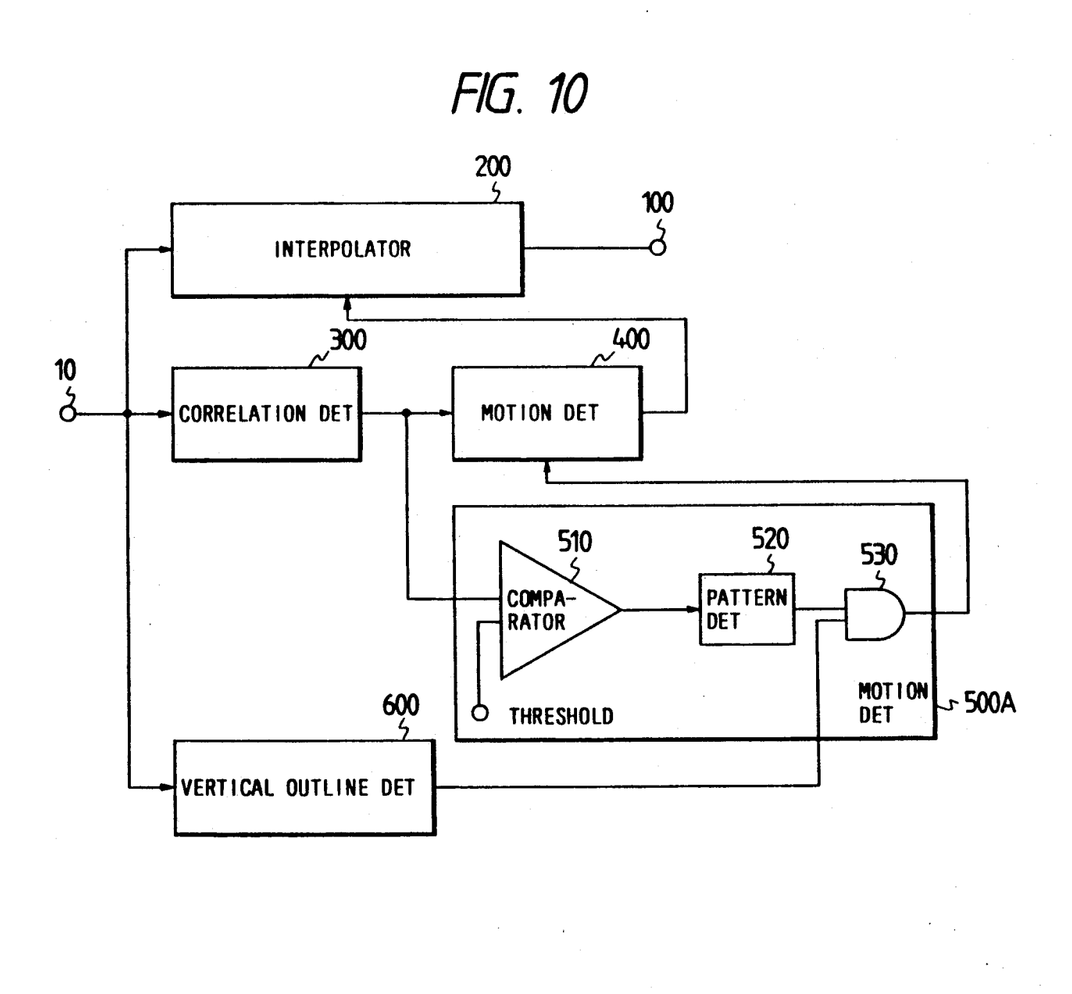
FIG. 10 is a block diagram of a video signal processing apparatus according to a sixth embodiment of this invention.

FIG. 10 shows a sixth embodiment of this invention which is similar to the embodiment of FIGS. 1-5 except for design changes indicated hereinafter. The embodiment of FIG. 10 includes a horizontal (horizontally-extending) outline detector 600 receiving an input video signal. The horizontal outline detector 600 functions to detect whether or not the input video signal has a component denoting a horizontally-extending outline or edge of an object. When such a horizontal outline is detected, the horizontal outline detector 600 outputs an "H" signal. When such a horizontal outline is not detected, the horizontal outline detector 600 outputs an "L" signal.

In the embodiment of FIG. 10, a sudden motion detector 500A additionally includes an AND gate 530. A first input terminal of the AND gate 530 is subjected to an output signal from a pattern detector 520. A second input terminal of the AND gate 530 is subjected to the output signal from the horizontal outline detector 600. The output signal from the AND gate 530 is fed to a normal motion detector 400 as a sudden motion detection signal.

In the case where a horizontal outline is detected by the horizontal outline detector 600 and thus the "H" signal is outputted from the horizontal outline detector 600 to the AND gate 530, the AND gate 530 is open so that the output signal from the pattern detector 520 is transmitted through the AND gate 530 to the normal motion detector 400. Thus, the output signal from the pattern detector 520 is enabled and is used as a control signal for the normal motion detector 400. In this way, the output signal from the pattern detector 520 is enabled when a horizontal outline is detected.

On the other hand, in the case where a horizontal outline is not detected by the horizontal outline detector 600 and thus the "L" signal is outputted from the horizontal outline detector 600 to the AND gate 530, the AND gate 530 is closed so that the AND gate 530 outputs an "L" signal to the normal motion detector 400 regardless of the state of the output signal from the pattern detector 520. In this way, the output signal from the pattern detector 520 is ignored when a horizontal outline is not detected. This process improves the reliability of the detection of a sudden vertical motion.

Figure 11:
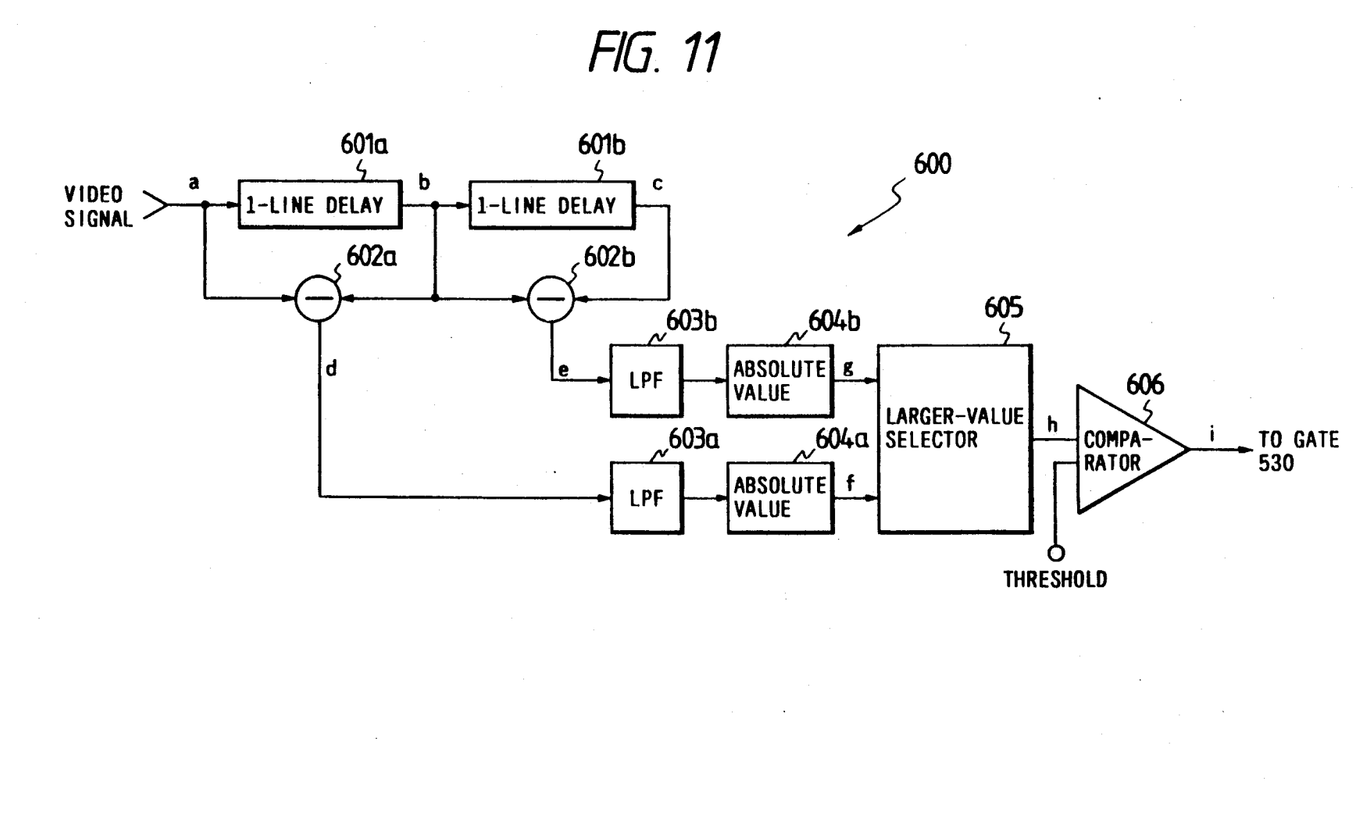
FIG. 11 is a block diagram of the horizontal outline detector of FIG. 10.

As shown in FIG. 11, the horizontal outline detector 600 includes 1-line period delay devices 601a and 601b, subtracters 602a and 602b, low pass filters 603a and 603b, absolute value circuits 604a and 604b, a larger value selector 605, and a comparator 606. The input video signal at the point "a" of FIG. 11 is fed to the 1-line period delay device 601a and a first input terminal of the subtracter 602a. The waveform of the input video signal is denoted by "a" in FIG. 12. The input video signal is delayed by the 1-line period delay device 601a by a 1-line period. The output signal from the 1-line period delay device 601a which appears at the point "b" of FIG. 11 is fed to the 1-line period delay device 601b and a second input terminal of the subtracter 602a. The waveform of the output signal from the 1-line period delay device 601a is denoted by "b" in FIG. 12. The subtracter 602a executes the subtraction between the input video signal and the output signal from the 1-line period delay device 601a, and outputs a resultant signal to the point "d" of FIG. 11. The waveform of the output signal from the subtracter 602a is denoted by "d" in FIG. 12. The output signal from the subtracter 602a is processed by the low pass filter 603a. The output signal from the low pass filter 603a is converted by the absolute value circuit 604a into an absolute value signal which appears at the point "f" of FIG. 11 and which represents the absolute value of the output signal from the low pass filter 603a. The waveform of the absolute value signal generated by the absolute value circuit 604a is denoted by "f" in FIG. 12. The absolute value signal is fed from the absolute value circuit 604a to a first input terminal of the larger value selector 605.

The output signal from the 1-line period delay device 601a (see "b" of FIG. 12) is fed to a first input terminal of the subtracter 602b. In addition, the output signal from the 1-line period delay device 601a is delayed by the 1-line period delay device 601b by a 1-line period. The output signal from the 1-line period delay device 601b which appears at the point "c" of FIG. 11 is fed to a second input terminal of the subtracter 602b. The waveform of the output signal from the 1-line period delay device 601b is denoted by "c" in FIG. 12. The subtracter 602b executes the subtraction between the output signals from the 1-line period delay devices 601a and 601b, and outputs a resultant signal to the point "e" of FIG. 11. The waveform of the output signal from the subtracter 602b is denoted by "e" in FIG. 12. The output signal from the subtracter 602b is processed by the low pass filter 603b. The output signal from the low pass filter 603b is converted by the absolute value circuit 604b into an absolute value signal which appears at the point "g" of FIG. 11 and which represents the absolute value of the output signal from the low pass filter 603b. The waveform of the absolute value signal generated by the absolute value circuit 604b is denoted by "g" in FIG. 12. The absolute value signal is fed from the absolute value circuit 604b to a second input terminal of the larger value selector 605.

The larger value selector 605 selects one of the two absolute value signals which represents the larger absolute value, and outputs the selected absolute value signal to the point "h" of FIG. 11. The waveform of the selected absolute value signal is denoted by "h" in FIG. 12. The selected absolute value signal is fed from the larger value selector 605 to a first input terminal of the comparator 606. A second input terminal of the comparator 606 is subjected to a signal representative of a predetermined threshold which is generated by a suitable device (not shown). The comparator 606 compares the absolute value signal with the threshold signal, and outputs a resultant signal to the point "i" of FIG. 11. The waveform of the output signal from the comparator 606 is denoted by "i" in FIG. 12. The "H" output signal from the comparator 606 represents the presence of a horizontal outline of an object. The "L" output signal from the comparator 606 represents the absence of a horizontal outline of an object. The output signal from the comparator 606 is used as the output signal from the horizontal outline detector 600.

DESCRIPTION OF THE SEVENTH PREFERRED EMBODIMENT

Figure 12:
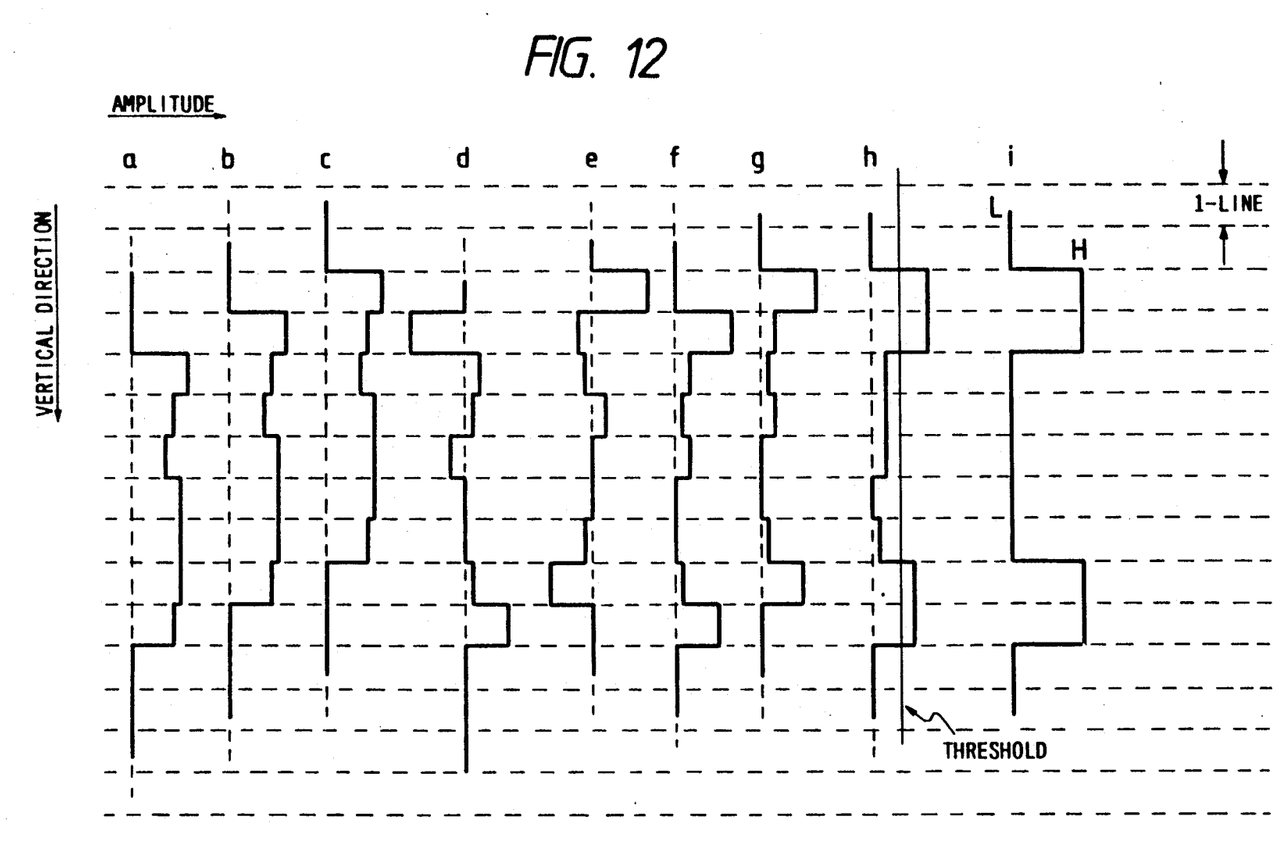
FIG. 12 is a diagram showing waveforms of various signals in the horizontal outline detector of FIG. 11.
Figure 13:
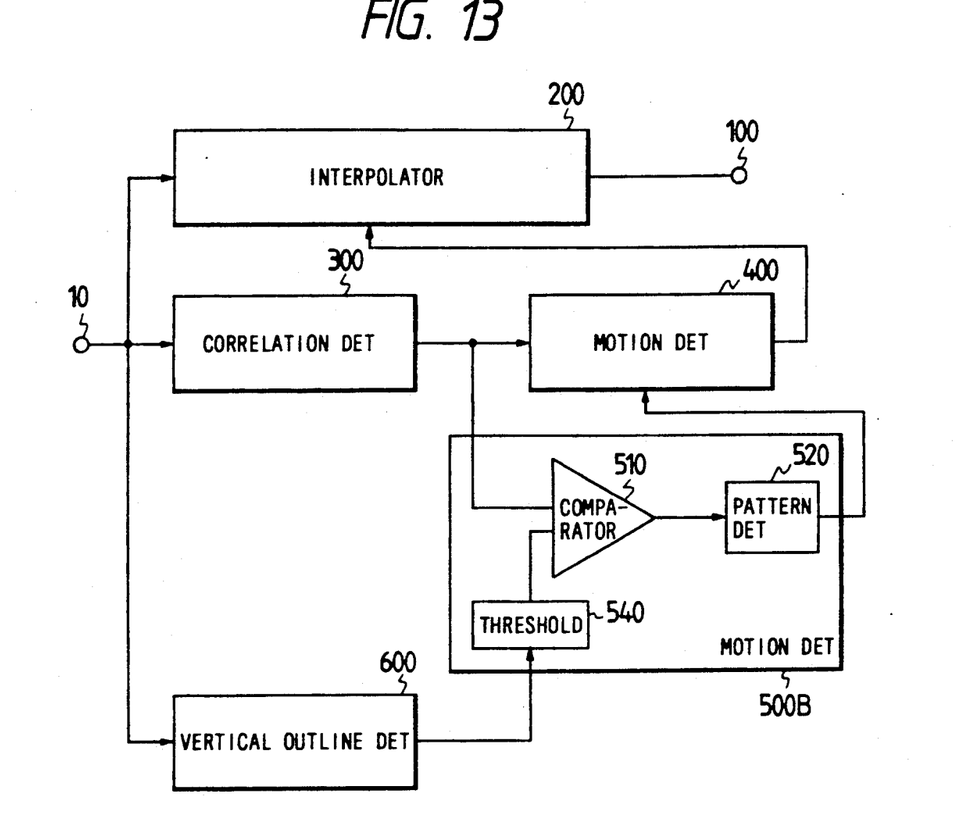
FIG. 13 is a block diagram of a video signal processing apparatus according to a seventh embodiment of this invention.

FIG. 13 shows a seventh embodiment of this invention which is similar to the embodiment of FIGS. 10–12 except for design changes indicated hereinafter. In the embodiment of FIG. 13, the AND gate 530 (see FIG. 10) is removed and the output signal form a pattern detector 520 is directly applied to a normal motion detector 400 as in the embodiment of FIGS. 1–5.

Figure 14:
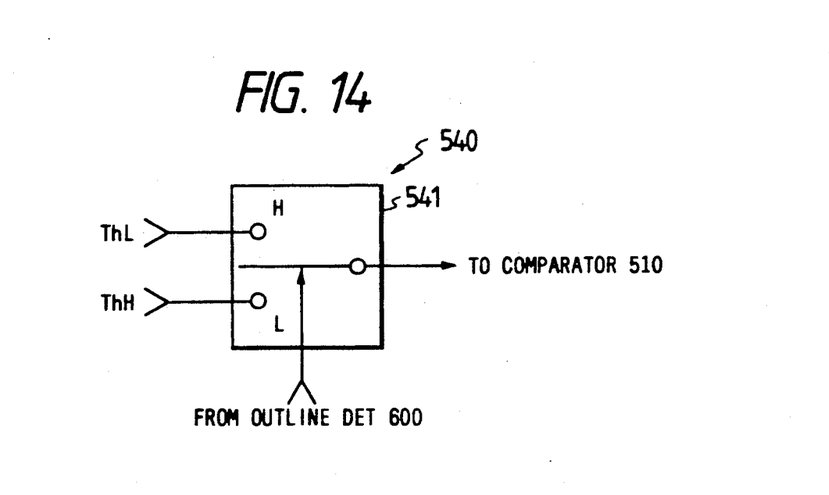
FIG. 14 is a block diagram of the threshold setting device of FIG. 13.

In the embodiment of FIG. 13, a sudden motion detector 500B includes a threshold setting device 540 receiving the output signal from a horizontal outline detector 600. As shown in FIG. 14, the threshold setting device 540 includes a selector 541 having two input terminals subjected to signals representative of predetermined thresholds ThL and ThH which are generated by suitable devices (not shown). A control terminal of the selector 541 receives the output signal from the horizontal outline detector 600. The selector 541 selects one of the threshold signals in response to the output signal from the horizontal outline detector 600, and outputs the selected threshold signal to a comparator 510.

The threshold ThL is smaller than the threshold ThH. When the output signal from the horizontal outline detector 600 is "L", that is, when a horizontal outline is absent, the selector 541 selects the signal of the larger threshold ThH and feeds the signal of the larger threshold ThH to the comparator 510. On the other hand, when the output signal from the horizontal outline detector 600 is "H", that is, when a horizontal outline is present, the selector 541 selects the signal of the smaller threshold ThL and feeds the signal of the smaller threshold ThL to the comparator 510. In this way, the sensitivity of the detection of a sudden vertical motion by the sudden motion detector 500B is increased when a horizontal outline is present, and the sensitivity is decreased when a horizontal outline is absent. This process improves the reliability of the detection of a sudden vertical motion.

What is claimed is:

1. A video signal processing apparatus comprising:
   means for detecting a correlation between frames represented by a video signal of an interlaced scanning format;
   means for detecting a sudden motion of an object represented by the video signal on the basis of said detected correlation;
   means for detecting a normal motion of the object represented by the video signal on the basis of said detected correlation;
   means for interpolating scanning lines represented by the video signal with changeable interpolation characteristics;
   means for changing the interpolation characteristics in response to said detected normal motion of the object and said detected sudden motion of the object.

2. The video signal processing apparatus of claim 1 wherein said interpolating means comprises means for separating the video signal into a Y signal and a C signal.

3. The video signal processing apparatus of claim 1 wherein said correlation detecting means comprises means for detecting a correlation between two successive frames.

4. The video signal processing apparatus of claim 1 wherein said correlation detecting means comprises a low pass filter effective in a horizontal frequency band.

5. The video signal processing apparatus of claim 1 wherein said normal motion detecting means comprises a low pass filter effective in a vertical frequency band.

6. A video signal processing apparatus comprising:
   difference detecting means for detecting a difference between frames represented by a video signal of an interlaced scanning format, and for generating a frame difference signal representative of said detected difference between the frames;
   means for generating a motion coefficient on the basis of said frame difference signal;
   means for interpolating scanning lines represented by said video signal with changeable interpolation characteristics;
   means for changing said interpolation characteristics in accordance with said motion coefficient;
   means for comparing said frame difference signal with a signal representative of a predetermined threshold;
   means for taking out results of said comparing at adjacent pixels;
   pattern detecting means for detecting that said taken-out results have a predetermined pattern; and
   means for changing said motion coefficient to change the interpolation characteristics toward interpolation characteristics suited to a stationary picture when said pattern detecting means detects that the taken-out results have the predetermined pattern.

7. The video signal processing apparatus of claim 6 wherein said motion coefficient is changeable among a plurality of predetermined values.

8. The video signal processing apparatus of claim 6 wherein said adjacent pixels align in a vertical direction.

9. The video signal processing apparatus of claim 6 wherein said taken-out results are represented by logical values.

10. The video signal processing apparatus of claim 6 wherein said motion coefficient changing means comprises means for setting the motion coefficient to a predetermined value.

11. The video signal processing apparatus of claim 6 wherein said coefficient changing means comprises means for setting a predetermined motion coefficient, and means for selecting and outputting one of the predetermined motion coefficient and the motion coefficient generated by the coefficient generating means which is closer to a motion coefficient corresponding to a stationary picture.

12. A video signal processing apparatus comprising:
    difference detecting means for detecting a difference between frames represented by a video signal of an interlaced scanning format, and for generating a frame difference signal representative of said detected difference between the frames;
    means for generating a motion coefficient on the basis of said frame difference signal;
    means for interpolating scanning lines represented by said video signal with changeable interpolation characteristics;
    means for changing said interpolation characteristics in accordance with said motion coefficient;
    means for comparing said frame difference signal with a signal representative of a predetermined threshold;
    means for taking out results of said comparing at adjacent pixels;
    pattern detecting means for detecting that said taken-out results have a predetermined pattern, and for outputting a signal representative of a result of the detection that said taken-out results have the predetermined pattern;
    outline detecting means for detecting a horizontal outline of an object represented by the video signal, and for outputting a signal representative of said detected horizontal outline;
    means for gating the output signal from said pattern detecting means in response to the output signal from said outline detecting means; and
    means for changing said motion coefficient in response to an output signal of said gating means to change the interpolation characteristics toward interpolation characteristics suited to a stationary picture.

13. A video signal processing apparatus comprising:
    difference detecting means for detecting a difference between frames represented by a video signal of an interlaced scanning format, and for generating a frame difference signal representative of said detected difference between the frames;
    means for generating a motion coefficient on the basis of said frame difference signal;
    means for interpolating scanning lines represented by said video signal with changeable interpolation characteristics;
    means for changing said interpolation characteristics in accordance with said motion coefficient;
    outline detecting means for detecting a horizontal outline of an object represented by the video signal, and for outputting a signal representative of said detected horizontal outline;
    means for setting a threshold signal representative of a threshold in accordance with the output signal from said outline detecting means;

means for comparing said frame difference signal with said threshold signal;
means for taking out results of said comparing at adjacent pixels;
pattern detecting means for detecting that said taken-out results have a predetermined pattern, and for outputting a signal representative of a result of the detection that said taken-out results have the predetermined pattern; and
means for changing said motion coefficient in response to the output signal from said pattern detecting means to change the interpolation characteristics toward interpolation characteristics suited to a stationary picture when said pattern detecting means detects that the taken-out results have the predetermined pattern.

14. A video signal processing apparatus comprising:
means for interpolating a video signal with changeable interpolation characteristics;
means for detecting a predetermined sudden vertical motion of an object represented by the video signal; and
means for changing said interpolation characteristics when said detecting means detects the predetermined sudden vertical motion.

15. The video signal processing apparatus of claim 14 wherein said detecting means comprises means for successively detecting correlations between frames represented by the video signal, and means for detecting a predetermined pattern of the detected correlations at vertically-aligned adjacent pixels represented by the video signal.

* * * * *